United States Patent Office 3,651,146
Patented Mar. 21, 1972

3,651,146
PROCESS FOR THE PREPARATION OF
TRIARYLBORANES
Don Morris von Schriltz, Wilmington, Del., assignor to
E. I. du Pont de Nemours and Company, Wilmington,
Del.
No Drawing. Filed Feb. 25, 1970, Ser. No. 14,192
Int. Cl. C07f 5/02
U.S. Cl. 260—606.5 B  4 Claims

ABSTRACT OF THE DISCLOSURE

An improved process for the preparation of triarylboranes such as triphenylborane which comprises reacting an aryl Grignard reagent with a trialkylborate, isolating the product by hydrolysis, extracting the resultant material with an organic solvent, washing, drying and concentrating the extractant to recover the crude product, and thereafter treating the crude product with an aliphatic hydrocarbon solvent which dissolves undesired by-products and leaves substantially pure triarylborane.

BACKGROUND OF THE INVENTION

It has been known for some time to prepare trialkyl- and triarylboranes by reaction of the appropriate Grignard reagent with a boron halide or with a borate ester. The trialkyl boranes are highly volatile and can be readily separated from the reaction mixtures. The triarylboranes are of low volatility; many of them are sensitive to oxygen, and consequently their separation from reaction mixtures is attended with difficulty, particularly in syntheses based on borate esters. Attempts to separate the undesired by-product by distillation or by crystallization wherein the reaction product is subjected to thermal treatment invariably leads to excessive degradation of the desired triarylboranes. Moreover, syntheses based on boron halides such as $BF_3$ are attended by the formation of tetra-arylborane anions if even a slight excess of Grignard reagent is used.

Accordingly, it is the object of this invention to provide a method of synthesis of triarylboranes which would be free of the above-mentioned difficulties.

STATEMENT OF INVENTION

The object of this invention is realized in the discovery of an improvement to the method of synthesizing triarylboranes by reaction of an appropriate aryl Grignard reagent with a borate ester. The improvement comprises subjecting the isolated reaction product of an aryl Grignard reagent with a borate ester to the action of an aliphatic hydrocarbon liquid which is capable of dissolving by-products of the reaction, but which does not dissolve the desired triarylborane. The resulting triarylborane may be used as obtained for various purposes or, if a more highly purified product is desired or is necessary, the product can be further purified by distillation or by crystallization from an appropriate solvent.

The process of this invention is carried out essentially in accordance with conventional Grignard reaction techniques used for oxygen-sensitive materials. The appropriate aromatic Grignard reagent such as phenyl magnesium chloride or phenyl magnesium bromide is reacted with the trialkylborate such as trimethylborate or triethylborate in a solvent such as diethyl ether, dibutyl ether, tetrahydrofuran or dioxane in an inert atmosphere such as nitrogen. The molar ratio of the Grignard reagent to the borate compound should be at least 3:1, and an excess of this Grignard reagent can be used, the amount in excess being governed by the yield of the product desired and by economic considerations. The reactions are usually carried out at the refluxing temperature of the particular solvent being used. For convenience, the borate ester is introduced into the reaction flask or vessel containing the Grignard reagent and the reaction is carried on for a time sufficient to permit introduction of all of the reactants to the reaction vessel and to insure that the reaction is substantially complete. Refluxing of the reaction mixture for a period of 30 to 60 minutes after all of the borate ester has been added is usually sufficient to insure completion of the reaction.

Following the usual isolation procedure of acid hydrolysis, extraction with an organic solvent such as cyclohexane, washing and drying of the extractant, and concentration, the crude product so obtained is then treated with an aliphatic hydrocarbon liquid having a boiling point below 80° C., which has the effect of dissolving the occluded by-products, but has relatively little solvent action on the desired triarylborane.

Suitable hydrocarbon liquids include n-pentane, 2-methylbutane, 2-methylpentane, 2,2-dimethylbutane, 2,3-dimethylbutane and cyclopentane and mixtures thereof. Petroleum ether comprises a particularly useful mixture of aliphatic hydrocarbon liquids. The treatment of the product with these liquids may be carried out at a temperature ranging from essentially room temperature to a temperature below 0° C., the important consideration being that the desired product be substantially insoluble in the particular liquid being used.

The method of synthesis is applicable to the preparation of such arylboranes as triphenylborane, tritolyborane, trixylylboranes, trinaphthylboranes, and tribenzylboranes. Of these, triphenylborane is particularly useful as a promoter in the hydrocyanation of olefin compounds in the presence of nickel [O] triarylphosphite catalyst complexes, such as are described in U.S. patent application Ser. No. 509,432, filed Nov. 23, 1965, by W. C. Drinkard and R. V. Lindsey.

DESCRIPTION OF THE PREFERRED EMBODIMENTS

In the preferred embodiment of this invention, the aliphatic hydrocarbon liquid has a boiling point in the range of 30–60° C. Further, the extraction step is carried out with the liquid being cooled to a temperature below 0° C. and still more preferably to a temperature below −50° C. so as to reduce the solubility of the desired triarylborane in the liquid and thus increase its yield.

The triarylboranes of greatest interest are triphenylborane and tritolylborane. The preferred molar ratio of the aryl Grignard reagent to the borate esters is at least 4.5:1 and particularly good results are obtained in the order of 6:1. The preferred aryl Grignard reagent is phenyl magnesium chloride, because of its lower cost although phenyl magnesium bromide or phenyl magnesium iodide can also be employed.

The process of this invention is more fully illustrated in the examples to follow.

Example 1

To a reaction flask fitted with stirrer, reflux condenser, and drying tube and containing a solution of 54 grams (0.3 mole) of phenyl magnesium bromide in 100 ml. of diethyl ether, there is added drop-wise a solution of 5.7 grams of trimethylborate (0.055 mole) in 50 ml. of diethyl ether. The resulting mixture is heated at reflux for 90 minutes under a blanket of nitrogen and is then poured into 50 ml. of cold, concentrated hydrochloric acid. An additional 75 ml. of ether is added and the resulting organic layer is separated and washed with sodium bicarbonate solution and water. The ether solution is dried over anhydrous calcium sulfate and the ether is then removed under vacuum. To the crude brown solid product, there is added 50 ml. of petroleum ether (B.P. 30–60° C.) which has been precooled in "Dry Ice" and the whole is stirred briefly. Filtration of the slurry gives a yield of 7.95 gms. of triphenylborane, corresponding to a yield of 68% based on the starting trimethylborate.

The extracted product is further purified by distilling at a pressure of 15 mm. at 203° C. The yield of product from the distillation is essentially quantitative. By contrast, attempts to carry out purification by distillation of the crude product which had not been extracted with petroleum ether leads to excessive degradation of the product with a very low yield of purified product being obtained. Recrystallization of the crude product from boiling n-hexane gave a 6% yield of purified product.

Example 2

Following the procedure of Example 1, a solution of 2.85 grams of trimethylborate (0.0275 mole) in 50 ml. of tetrahydrofuran is added drop-wise to a solution of 20.5 g. (0.15 mole) of phenyl magnesium chloride in 100 ml. of tetrahydrofuran. The resulting mixture is heated at reflux for 3 hours before being hydrolyzed and washed as described in Example 1. By subjecting the crude product to extraction with petroleum ether as described in Example 1, there is obtained a correspondingly high yield of purified triphenylborane.

What is claimed is:
1. In a process of preparing a triarylborane which comprises reacting an aryl Grignard reagent with an alkyl borate, hydrolyzing the reaction product, extracting the reaction product with an organic liquid which dissolves the reaction product, drying and concentrating the extractant to recover the triarylborane which contains occluded by-products of the reaction, the improvement which comprises treating the recovered reaction product with an aliphatic hydrocarbon liquid having a boiling point below 80° C. in which the by-products are soluble, but in which the triarylborane is essentially insoluble and recovering the triarylborane substantially free of by-product.
2. The process of claim 1 wherein the aliphatic hydrocarbon liquid has a boiling point range between 30° C. and 60° C.
3. The process of claim 2 wherein the aliphatic hydrocarbon liquid is cooled to a temperature below 0° C.
4. The process of claim 1 wherein the triarylborane is triphenylborane.

References Cited

UNITED STATES PATENTS 3,475,496   10/1969   Smai et al. _____ 260—606.5 B

DELBERT E. GANTZ, Primary Examiner

W. F. W. BELLAMY, Assistant Examiner